Patented May 14, 1929.

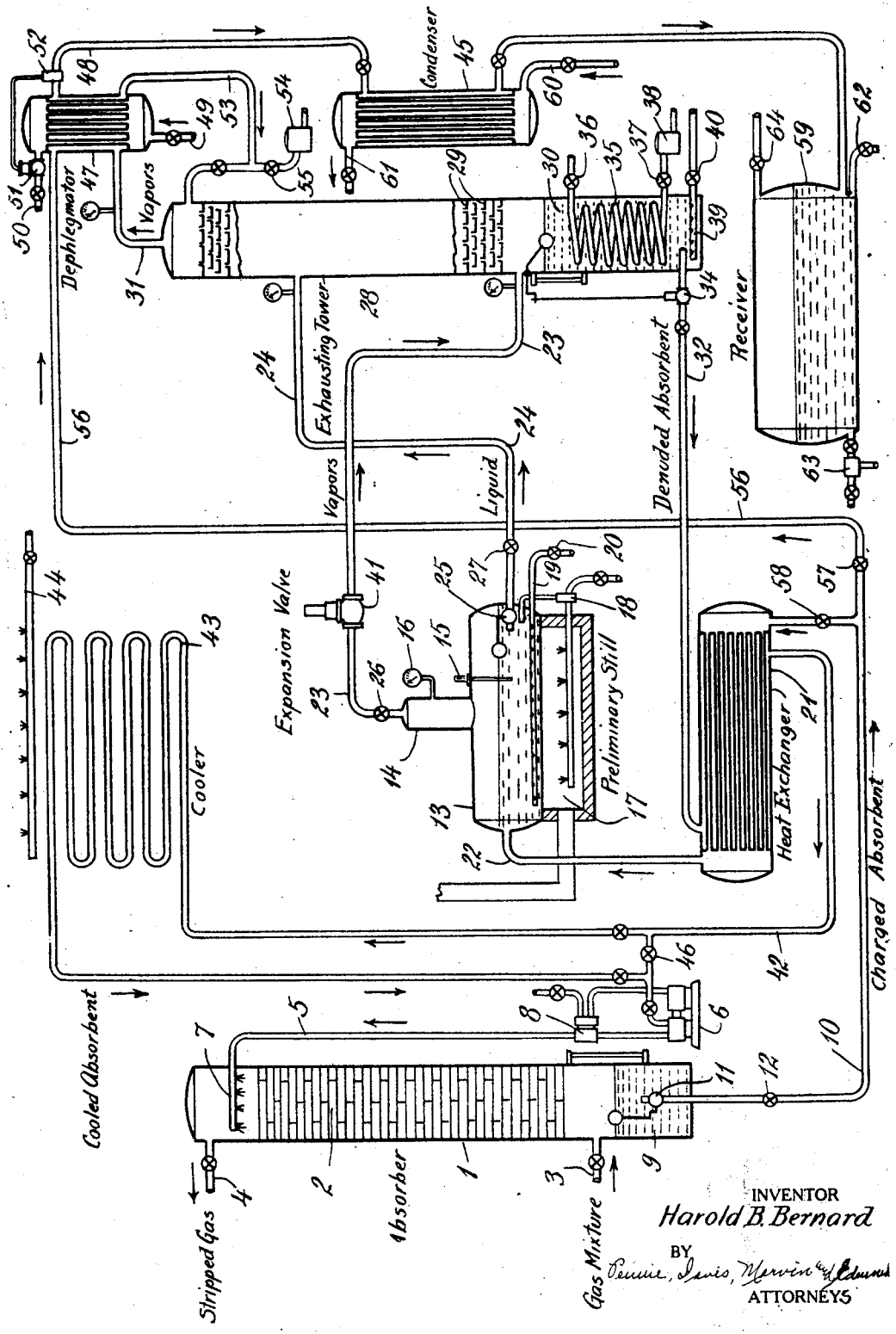

1,713,323

UNITED STATES PATENT OFFICE.

HAROLD B. BERNARD, OF TULSA, OKLAHOMA, ASSIGNOR TO SINCLAIR OIL AND GAS COMPANY, OF TULSA, OKLAHOMA, A CORPORATION OF MAINE.

APPARATUS FOR RECOVERING GASOLINE.

Original application filed May 8, 1924, Serial No. 711,779. Divided and this application filed November 14, 1924. Serial No. 749,892.

This invention relates to improvements in apparatus for separating constituents of gas mixtures by treatment with absorbents and for recovering the absorbed constituents from the liquid absorbents. More particularly, this invention relates to apparatus which is specially adapted for recovering liquid mixtures of hydrocarbons of the type commonly known as natural gas gasoline, natural gasoline and casinghead gasoline from natural gas and the like. The apparatus of the present invention is of special value and application in carrying out the process described in an application filed May 8th, 1924, Serial No. 711,779 and which has issued as Patent No. 1,560,137 of which this application is a division.

Briefly, in recovering the natural gas gasoline from natural gas, or similar gaseous mixtures, by absorption in a liquid menstruum, the natural gas is subjected to treatment with a liquid absorbent capable of selectively dissolving or entraining the gasoline constituents, the stripped gas and the absorbent charged with gasoline are separated, the absorbed gasoline, or as great a part as possible or practicable, is distilled from the absorbent, the denuded absorbent is cooled and returned for further treatment of an additional quantity of natural gas, and the separated gasoline is condensed and collected. The present invention relates particularly to an improved apparatus adapted for carrying out processes of this general character in an improved and advantageous way.

The apparatus of the invention comprises an absorber or absorbers for treating the gas mixture with the liquid absorbent, a preliminary still and connections for conducting charged absorbent from the absorber thereto, a receptacle through which the liquid residuum from the preliminary still is passed in countercurrent flow and in direct contact with the vapors and gases from the preliminary still for exhausting the liquid residuum and appropriate connections between this receptacle and the preliminary still including means for regulating and reducing the pressure between the preliminary still and the exhausting receptacle and for maintaining a lower pressure in the exhausting receptacle, a cooler and connections for returning denuded liquid absorbent from the exhausting receptacle to the absorber therethrough.

In the apparatus of the present invention, the desired constituents are separated from the gas mixture by absorption in the liquid absorbing medium and the charged liquid absorbent is then subjected to a preliminary distillation treatment wherein an initial separation of gases, vapors and liquid is effected. Following the distillation treatment, the pressure upon the separated gases and vapors and the liquid is reduced and the preheated liquid is passed in countercurrent flow and in direct contact with the preheated gases and vapors under a lower pressure than that prevailing in the preliminary distillation treatment. The absorbed constituents are thus recovered from the liquid absorbent in an improved manner and may be collected and subjected to further treatment as desired. The denuded absorbent is then cooled and returned for further treatment of an additional quantity of the gas mixture.

The absorbing apparatus employed may be of conventional construction and arrangement. The preliminary still may be a still of ordinary construction adapted to withstand the pressure employed and may be heated by direct fire or submerged steam coil or by flues through which heating gases are passed. In practice, a horizontal firetube boiler can be employed although requiring a closer regulation of the liquid level than is necessary with a shell or liquid tube type of still. Connections may also be provided for the direct introduction of steam or other inert gas into the liquid charge, particularly where it is desirable to employ lower temperatures in the preheater. Automatic or semi-automatic means may also be used for controlling the temperature and the liquid level.

The exhausting receptacle may be a bubble tower or baffle tower of conventional construction or a helical tower of the type described in an application of John E. Bell filed April 1, 1924, Serial No. 703,338 and which has issued as Patent No. 1,683,151 or other tower of similar function adapted to promote intimate contact and heat exchange between downwardly flowing liquid and upwardly flowing vapors and gases. Connections are provided for discharging the liquid residuum from the preliminary still into the upper part of this column and the vapors and gases from the preliminary still into the lower part of this column. By arranging the inlet connection for the liquid residuum spaced below the top of the tower, the upper part of the tower above this inlet connection can be employed as a rectifier for the separated constituents. The vapors and gases containing the separated constituents are withdrawn from the top of the exhausting tower, and a cooler is provided and connections are arranged for returning the denuded absorbent from the lower end of the tower through the cooler to the absorbing apparatus.

The pressure upon the vapors and gases may be reduced by the interposition of a valve in the connection conducting the vapors and gases to the exhausting tower. A manually operated valve or a sensitive automatic expansion valve may be used for this purpose. The pressure upon the liquid residuum may be reduced by means of a valve between the still and the exhausting tower. This valve may be operated by level operated means in the preliminary still, thus cooperating with the expansion valve in the vapor and gas connection in controlling the pressure reduction and the liquid level in the preliminary still. Or the point of discharge of the liquid residuum into the exhausting tower may be arranged at a point sufficiently elevated above the liquid level in the preliminary still so that the column of liquid between the liquid level in the preliminary still and the inlet into the tower imposes the desired additional pressure. A level operated valve may be employed in combination with such an elevated discharge for controlling the rate of discharge of liquid residuum into the tower.

Where a tower is employed as the exhausting receptacle, it is advantageous to employ an elevated discharge, either alone or in combination with a pressure reducing valve, for reducing the pressure between the preliminary still and the exhausting tower and to use the pressure in the preliminary still for forcing the liquid residuum from the still into the upper part of the exhausting tower. Hot oil is difficult to pump, and, by utilizing all or a part of the excess pressure prevailing in the preliminary still to circulate the hot liquid residuum to the exhausting tower, pumping of the hot liquid residuum can be avoided.

The upper end of the exhausting tower may be provided with cooling coils or other cooling surfaces and the separated constituents subjected to dephlegmation within the upper end of the tower, or the vapors and gases escaping from the upper end of the tower may be conducted through one or more cooled receptacles or dephlegmators before being subjected to final condensation. Where a separate dephlegmating receptacle is employed, the dephlegmate can be returned to the rectifying section of the tower, that is the section above the hot liquid residuum inlet, to assist in the rectification therein. A valved connection may also be provided for introducing a regulated part of the charged absorbent from the absorbing apparatus into direct contact with the vapors and gases in one or more of the dephlegmators to assist or to regulate the dephlegmation.

The invention will be further described in connection with the accompanying drawing illustrating in a diagrammatic way apparatus embodying the invention; but it is intended and will be understood that this further description and illustration are for the purpose of exemplification and that the invention is not limited thereto. The accompanying drawing schematically represents, in elevation and in section with parts broken away, a complete apparatus embodying the invention which is particularly adapted for recovering gasoline or the like from natural gas or similar gaseous mixtures.

The absorber illustrated in the drawing consists of a vertically arranged tower 1 with baffles or filling material 2 for promoting intimate contact between gases and liquids in the absorber arranged on the interior of the absorber. A connection 3 is provided for introducing the natural gas, or other gas mixture, into the absorber below the baffles or filling material and a connection 4 is provided for discharging stripped gas from the upper end of the tower after it has passed upwardly through the baffles or filling material therein. The liquid absorbing medium is introduced into the top of the tower through connection 5 by means of pump 6 and is distributed over the baffles or filling material by means of spray-head 7. The gas mixture and the absorbent are thus directly contacted in countercurrent flow. A governor 8 is provided actuated by a flow rate mechanism in connection 5 for controlling the operation of the pump 6 to maintain a constant rate of flow of the liquid absorbent. The charged absorbent collects in the liquid reservoir 9 in the lower part of the tower and is discharged therefrom through connection 10. A float actuated valve 11 is provided in the outlet to connection 10 for maintaining the liquid level in the reservoir below the gas inlet and above the liquid outlet. In place of the single absorber shown, a series of absorbers may be employed and the gas mixture and absorbent passed successively therethrough. In treating natural gas for the recovery of gasoline superatmospheric pressure is commonly employed in the absorber to promote the absorption, and in the apparatus illustrated the pressure in the absorber is employed to force the charged absorbent to the preliminary still. A pump may, however, be employed in connection 10 for withdrawing the charged absorbent from the absorbing tower and circulating it to the preliminary still. Where high pressures prevail in the absorber, the action of the valve 11 in reducing and regulating the pressure may be supplemented by valve 12.

The preliminary still comprises a shell 13 having a vapor dome 14 and is provided with the usual accessories including a level gauge (not shown), a thermometer 15 and a pressure gauge 16. The still is heated over a gas or oil fired furnace 17 and a thermostatically operated control 18 is provided for regulating the temperature in the preliminary still by controlling the rate of combustion in the furnace. In place of the furnace, a steam coil arranged below the normal liquid level in the still may be used for heating the contents of the still. A perforated pipe 19 having control valve 20 is arranged along the bottom of the still shell for introducing steam or other inert gas directly into the charge in the preliminary still. The charged absorbent from the absorber is introduced into the preliminary still through connection 10, heat exchanger 21 and connection 22. The liberated vapors and gases escape from the preliminary still through connection 23 and the hot liquid residuum is discharged through connection 24. A float actuated valve 25 is provided on the outlet to the connection 24 for maintaining the liquid level in the preliminary still between the desired limits. Supplementary control valves 26 and 27 may be provided in connections 23 and 24 respectively.

The exhausting tower illustrated is of bubble tower construction and comprises a vertically arranged shell 28 having an extended series of bubble plates 29 therein and is arranged with a liquid reservoir 30 in the lower end. The connection 23 from the preliminary still enters the tower below the lowermost bubble plate and the connection 24 is arranged to discharge into the tower at a point above the liquid level in the preliminary still and somewhat below the uppermost bubble plate. The space within the tower between the connections 23 and 24 thus serves as the exhausting receptacle and the space above the connection 24 as a rectifying receptacle. The separated vapors and gases escape from the rectifier through connection 31 and the denuded absorbent is withdrawn from the reservoir 30 through connection 32. A float actuated valve 34 is provided in the outlet to the connection 32 to maintain the level in the liquid reservoir 30 below the gas and vapor inlet and above the liquid outlet. A steam coil 35 for supplying additional heat, for example, to make up for heat losses in the connections between the preliminary still and the exhausting tower, is provided in the lower part of the tower. The steam coil is controlled by valves 36 and 37 and is connected on its outlet end with steam trap 38. A perforated pipe 39 controlled by valve 40 is also provided in the base of the tower for the direct introduction of steam or other inert gas.

In the connection 23 conducting the vapors and gases from the preliminary still to the lower part of the exhausting tower, a sensitive expansion or pressure reducing valve 41 is interposed. The valve 26 in this connection may also be employed to supplement the regulation of the valve 41. The outlet of the connection 24 conducting the liquid residuum from the preliminary still to the upper part of the exhausting tower is elevated a substantial distance above the liquid level in the preliminary still. The vertical distance between the outlet of connection 24 and the normal liquid level in the preliminary still may be adjusted to maintain the desired additional pressure in the preliminary still; or where pressure in excess of that imposed by this liquid column is desired, valve 27 may be used. Where the elevation of the outlet is insufficient to maintain the desired pressure, the valve 25 also acts to regulate the pressure reduction. The regulation of the valve 25 may be supplemented or replaced by regulating valve 27.

The heat exchanger 21 is of the shell and tube type. The charged absorbent passing from the absorber to the preliminary still is circulated through the tubes of the heat exchanger. The denuded absorbent from the exhausting column is circulated about the tube and is discharged through connection 42. The denuded absorbent is thus cooled and the charged absorbent preheated on its way to the preliminary still. The denuded absorbent after passing through the heat exchanger 21 is circulated through the cooler 43 on its way to the pump 6. The cooler illustrated consists of an atmospheric cooling coil over which water or other cooling fluid is distributed from perforated pipe 44. A shell and tube type of cooler may be employed in place of the atmospheric type of cooler but an atmospheric cooler is of advantage where cooling water of satisfactory quality for use in a shell and tube type of cooler is not readily available or where it is desirable to supplement the cooling action of the sensible heat of the cooling water by the heat of evaporation of part of the water. Likewise, an atmospheric cooler or condenser may be used in place of or as a supplementary cooler in connection with the condenser 45. Where the cooling effected in the heat exchanger 21 is sufficient or where it is desirable to limit the degree of extraction effected in the absorber, for example to prevent or reduce the absorption of wild gasoline vapors from natural gas, all or a part of the absorbent leaving the heat exchanger 21 may be by-passed around the cooler 43 through valved connection 46.

A single dephlegmator 47 of shell and tube construction is illustrated although a series of such dephlegmators may be employed. The vapors escaping from the upper end of the exhausting tower enter the dephlegmator 47 through connection 31 and after circulating about the cooling tubes therein escape through connection 48. Cooling fluid is supplied to the dephlegmator through connection 49 and after passing through the tubes therein escapes through connection 50. A thermostatically operated valve 51 is provided in the cooling fluid outlet 50 actuated by the thermostat 52 in the vapor outlet 48 for controlling the cooling and condensation within the dephlegmator. From the dephlegmator, any condensate is returned to the upper part of the rectifying section of the tower 28 through connection 53 arranged to form a liquid seal to prevent discharge of vapors from the tower therethrough. A trap 54 is connected to the lowest point of the seal for removing any water condensed in the dephlegmator where direct steam is employed in the preliminary still or exhausting tower. Where the removal of water at this point is not desired, the valve 55 is closed disconnecting the trap. The dephlegmate returned to the rectifying section of the tower 28 assists in the rectification, and the character of the final product can, within limits, be controlled by regulation of the character and quantity of dephlegmate. These factors can in turn be controlled by regulation of the temperature and amount of cooling fluid circulated through the dephlegmator.

The dephlegmation in the dephlegmator 47 can also be controlled and promoted by introducing a regulated amount of the charged absorbent from the absorber into direct contact with the vapors in the dephlegmator through connection 56 provided with control valve 57. Regulation of the amount of charged absorbent introduced into the dephlegmator can be effected by adjustment of valves 57 and 58. The absorbent and any unvaporized part of the absorbed constituents, after passing through the dephlegmator, is returned to the tower 28 through connection 53 and is subjected to the stripping operation therein, the resulting stripped absorbent also collecting in the reservoir 30 at the base of the tower and is returned therefrom to the absorber through connection 32.

The separated constituents escaping as vapors through connection 48 pass through the condenser 45 and the condensate is collected in the receiving drum 59. Cooling fluid is supplied to the condenser 45 through connection 60 and is discharged therefrom through connection 61. The condensate may be withdrawn from the receiving drum 59 through connection 62; or where direct steam is employed and the condensate in the drum 59 includes some water the condensate may be withdrawn through the separating trap 63 for the separation of water. Any vapors and gases collecting in the receiver are withdrawn through the valved outlet 64 and may be subjected to further treatment as desired.

The entire apparatus can be and advantageously is thoroughly heat insulated or lagged to prevent heat loss; particularly the preliminary still, the exhausting tower, the pressure reducing means and the connections between them. To assist in regulation of the operation of the apparatus, thermometers or other temperature indicating instruments can be arranged in the gas inlets and outlets and absorbent inlets and outlets in the absorbers, on the inlets and outlets of the heat exchangers and the absorbent coolers, on the vapor and gas and the liquid outlets from the preliminary still, on the exhausting tower inlets from the preliminary still and in the vapor outlet and liquid reservoir in the exhausting tower, on the cooling fluid connection and the vapor inlets and outlets and the dephlegmate return line of the dephlegmators, and on the condenser for the final product.

In operating the apparatus for separating gasoline constituents from natural gas, the natural gas is passed upwardly through the absorbing tower wherein it is contacted with the cooled liquid absorbent, the absorbent extracting the gasoline constituents. The charged absorbent is passed through the heat exchanger to the preliminary still in which an initial separation of gases and vapors is effected and after reducing the pressure upon the separated vapors and gases and the liquid, the separated gases and vapors and the liquid residuum are passed in countercurrent and in direct contact in the exhausting tower where the absorbed constituents are substantially completely removed from the absorbent. Where heat is applied only in the preliminary still, sufficient heat should be introduced to vaporize all of the gasoline content from the absorbent and to make up for any heat losses, although complete vaporization of the absorbed gasoline constituents is not effected in the preliminary still. Where heat is applied at other points, as in the exhausting tower, the amount of heat introduced in the preliminary still may be somewhat less. The temperatures employed may also be reduced by directly introducing steam or some other inert gas into the preliminary still or the exhausting tower. In place of using steam for this purpose, an inert gas may be employed. For example stripped gas which has passed through the absorber may be used in this manner. The stripped gas may be introduced at ordinary temperature for reducing the partial pressure of the absorbed gasoline constituents or it may be heated before introduction for supplying heat as well as for assisting vaporization by reduction of the partial pressure of the gasoline constituents. Where such gas is introduced it passes through the apparatus with the gasoline vapors and can be separated from the condensed gasoline in the receiver. Additional cooling of the final gasoline fraction may be desirable where stripped gas is employed in this manner. Due to the relatively higher pressures prevailing in the preliminary still, a selective vaporization of the lighter absorbed constituents is effected therein and vaporization or entrainment of the absorbent is avoided or minimized, even where a relatively light absorbent is employed. A relatively lower pressure prevails in the exhausting tower and the liquid absorbent is substantially completely denuded of its remaining content of its absorbed gasoline by direct contact in countercurrent flow with the heated vapors and gases therein. In the section of the exhausting tower above the liquid residuum inlet the separated vapors contained in the gasoline are subjected to rectification and any entrained or vaporized absorbent is separated from the gasoline. If additional heat is required to complete the stripping of the absorbent, for example heat losses between the preliminary still and the exhausting tower or too great cooling of the exhausting tower because of the expansion or vaporization of the vapors and gases upon reduction of pressure, a heating fluid is supplied to the heating coil in the base of the column or passed directly up through the column through the perforated pipe in the base thereof. This perforated pipe may be arranged at the lower part of the liquid reservoir as shown or it may be arranged above the liquid level in the reservoir. From the liquid reservoir in the base of the exhausting tower, the denuded absorbent is circulated through the heat exchanger giving up a part of its heat to the charged absorbent entering the preliminary still and after further cooling, if necessary, is returned to the absorber. The vapors and gases separated from the absorbent in the exhausting tower are passed through the rectifying section of the tower and thence through one or more dephlegmators, any dephlegmate is returned to the rectifying and exhausting tower, and the final gasoline fraction escaping from the dephlegmator as a vapor is condensed and collected.

One of the important advantages of the apparatus of the present invention is that it enables a more complete stripping of the liquid absorbent and the maintenance of conditions in which lower vaporization temperatures can be employed. In the separation of absorbent gasoline from a liquid absorbent, any constituents left in the absorbent by incomplete stripping comprise the heaviest and most valuable fraction of the absorbed gasoline so that complete stripping is also desirable in this respect. The more complete stripping of the absorbent which is effected in the apparatus of the present invention has the important result that it enables a reduction in the amount of absorbent circulated in the apparatus necessary for the treatment of any given amount of gas mixture or for the separation of any given amount of constituents of the gas mixture. The decreased amount of absorbent required reduces the size of the equipment and the amount of power required, for example, it permits the use of smaller pump capacity and smaller circulating lines. It also reduces the surface required in the heat exchangers and in the coolers for cooling the denuded absorbent. Less heat is likewise required to distill the absorbed gasoline or other absorbed constitutents, thus permitting the use of a smaller preliminary still capacity or a preliminary still with less heating surface as well as reducing the fuel consumption. The reduction in the amount of absorbent required likewise increases the thermal efficiency of the entire apparatus since it decreases the total amount of absorbent circulated through and alternately heated and cooled in the apparatus of the invention. More complete stripping of the absorbent also improves the absorptive capacity of the absorbing medium, enabling a greater percentage recovery of the desired constituents, while the improved efficiency of the apparatus in separating the absorbed constituents from the absorbing medium also enables the use of lower distillation temperatures in the preliminary still and the exhausting tower. The absorbed constituents are thus at a lower temperature after they are separated from the absorbing medium and the amount of cooling required to condense them or to bring them to atmospheric temperature is correspondingly reduced. Lower distillation temperatures also increase the hazard involved in handling hot combustible absorbents. Lower distillation temperatures also reduce the total amount of heat required to effect the distillation and reduce the temperature range over which the absorbent is alternately heated and cooled as it is circulated through the apparatus of the invention. The relative decrease in amount of absorbent required for the recovery of any given amount of the constituents of the gas mixture or for the treatment of any given amount of the gas mixture and the relative decrease in the temperature range involved in the operation of the apparatus combine to decrease the total heat differential and consequently to increase the practical thermal efficiency. The total heat required to be introduced into the apparatus is thus decreased and the total heat required to be abstracted from the apparatus is likewise decreased. The first of these factors reduces fuel consumption and the second reduces the amount of cooling required. It will be apparent that these advantages enable the recovery and separation of an increased amount of the constituents of the gas mixture or the treatment of an increased amount of the gas mixture with any given plant installation. The character of the product obtained is likewise improved in uniformity due to the more complete stripping of the absorbent and in quality due to the improved separation effected between the absorbed constituents and the liquid absorbent.

I claim:

1. An apparatus for separating the constituents of gaseous mixtures by treating with liquid absorbing mediums, comprising an absorber, a preliminary still, means for heating said still, an exhausting tower, a cooler, a dephlegmator, connections for conducting charged absorbent from the absorber to the preliminary still, connections for introducing vapors and gases from the still into the lower part of the tower and for introducing liquid from the still into the upper part of the tower including means for reducing the pressure between the still and the exhausting tower, connections for introducing vapors and gases from the exhausting tower into the dephlegmator, means for introducing a part of the charged absorbent from the absorber directly into the vapors and gases in the dephlegmator, means for circulating the gas mixture through the absorber, and connections for returning denuded absorbent from the exhausting tower through the cooler to the absorber.

2. An apparatus for separating the constituents of gaseous mixtures by treating with liquid absorbing mediums, comprising an absorber, a preliminary still, means for heating said still, an exhausting tower, a dephlegmator, connections for introducing vapors and gases from the still into the lower part of the tower and for introducing liquid from the still into the upper part of the tower, means for reducing the pressure between the still and the exhausting tower, connections for introducing vapors and gases from the exhausting tower into the dephlegmator, and means for introducing charged absorbent from the absorber directly into the vapors and gases in the dephlegmator.

In testimony whereof I affix my signature.

HAROLD B. BERNARD.